United States Patent
Hendel et al.

[11] Patent Number: 6,049,528
[45] Date of Patent: Apr. 11, 2000

[54] TRUNKING ETHERNET-COMPATIBLE NETWORKS

[75] Inventors: Ariel Hendel, Cupertino; Leo A. Hejza, Sunnyvale; Sampath H. K. Kumar, San Jose, all of Calif.

[73] Assignee: Sun Microsystems, Inc., Mountain View, Calif.

[21] Appl. No.: 08/885,072

[22] Filed: Jun. 30, 1997

[51] Int. Cl.$^7$ .............................. H04N 1/16; H04J 3/16
[52] U.S. Cl. ........................................... 370/235; 370/437
[58] Field of Search ............................ 370/466, 467, 370/469, 463, 445, 216, 229, 230, 235, 437

[56] References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/88 |
| 4,641,302 | 2/1987 | Miller | 370/60 |
| 4,652,874 | 3/1987 | Loyer | 340/825.05 |
| 4,737,953 | 4/1988 | Koch et al. | 370/94 |
| 4,807,111 | 2/1989 | Cochen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/60 |
| 4,922,503 | 5/1990 | Leone | 370/85.13 |
| 4,933,938 | 6/1990 | Sheehy | 370/85.13 |
| 4,935,869 | 6/1990 | Yamamoto | 364/200 |
| 5,130,977 | 7/1992 | May et al. | 370/60 |
| 5,150,358 | 9/1992 | Punj et al. | 370/84 |
| 5,159,685 | 10/1992 | Kung | 395/575 |
| 5,163,046 | 11/1992 | Hahne et al. | 370/79 |
| 5,210,746 | 5/1993 | Maher et al. | 370/79 |
| 5,220,562 | 6/1993 | Takada et al. | 370/85.13 |
| 5,231,633 | 7/1993 | Hluchyj et al. | 370/94.1 |
| 5,251,205 | 10/1993 | Callon et al. | 370/60 |
| 5,278,830 | 1/1994 | Kudo | 370/94.1 |
| 5,291,482 | 3/1994 | McHarg et al. | 370/60 |
| 5,293,379 | 3/1994 | Carr | 370/94.1 |
| 5,301,333 | 4/1994 | Lee | 395/725 |
| 5,309,437 | 5/1994 | Perlman et al. | 370/85.13 |
| 5,313,454 | 5/1994 | Bustini et al. | 370/13 |
| 5,343,471 | 8/1994 | Cassagnol | 370/85.13 |
| 5,353,412 | 10/1994 | Douglas et al. | 395/325 |
| 5,365,514 | 11/1994 | Hershey et al. | 370/17 |
| 5,386,413 | 1/1995 | McAuley et al. | 370/54 |
| 5,392,432 | 2/1995 | Engelstad et al. | 395/700 |

(List continued on next page.)

OTHER PUBLICATIONS

International Standard ISO/IEC 10038, ANSI/IEEE std 802.1D, First Edition, 1993.

"Load Balancing For Multiple Interfaces For Transmission Control Protocol/Internet Protocol For VM/MVS." IBM Technical Disclosure Bulletin, 38(9):7–9 (Sep. 1995).

Nishizono T., et al. Analysis On A Multilink Packet Transmission System. Electron. Commun. JPN. 1, Commun. (USA), 68(9):98–104 (Sep. 1985).

International Search Report, PCT/US98/13203, Sep. 9, 1999, 6 pages.

*Primary Examiner*—Douglas W. Olms
*Assistant Examiner*—David R. Vincent
*Attorney, Agent, or Firm*—Blakely Sokoloff Taylor & Zafman

[57] ABSTRACT

A network system dynamically controls data flow between physical links by logically combining multiple physical links into a single logical channel trunk, preferably to balance data flow carried by each link. Each link in the trunk has identical physical layer and identical media access control layer characteristics. A system server assigns a single media access control layer address to the single trunked logical channel, preferably randomly by hashing destination media access control layer addresses for the links. The system server includes, in addition to a physical layer and a network layer, a pseudo-driver software layer disposed therebetween, which pseudo-driver software layer functions as a multiplexer in a receive path and functions as a de-multiplexer in a transmit path. The resultant preferably Ethernet-compatible network system operates in full-duplex mode and distributes packets from the server to the links to preserve temporal order of data flow.

30 Claims, 5 Drawing Sheets

U.S. PATENT DOCUMENTS

| | | | |
|---|---|---|---|
| 5,394,402 | 2/1995 | Ross | 370/94.1 |
| 5,396,602 | 3/1995 | Amini et al. | 395/325 |
| 5,402,415 | 3/1995 | Turner | 370/60 |
| 5,404,538 | 4/1995 | Krappweis, Sr. | 395/725 |
| 5,410,540 | 4/1995 | Aiki et al. | 370/60 |
| 5,410,722 | 4/1995 | Cornaby | 395/800 |
| 5,420,862 | 5/1995 | Perlman | 370/85.13 |
| 5,422,838 | 6/1995 | Lin | 365/49 |
| 5,425,026 | 6/1995 | Mori | 370/60 |
| 5,425,028 | 6/1995 | Britton et al. | 370/94.1 |
| 5,426,736 | 6/1995 | Guineau, III | 395/250 |
| 5,432,907 | 7/1995 | Picazo, Jr. et al. | 395/200 |
| 5,450,399 | 9/1995 | Sugita | 370/60.1 |
| 5,455,820 | 10/1995 | Yamada | 370/17 |
| 5,457,681 | 10/1995 | Gaddis et al. | 370/56 |
| 5,459,714 | 10/1995 | Lo et al. | 370/13.1 |
| 5,459,717 | 10/1995 | Mullan et al. | 370/54 |
| 5,461,611 | 10/1995 | Drake, Jr. et al. | 370/54 |
| 5,461,624 | 10/1995 | Mazzola | 370/85.13 |
| 5,473,607 | 12/1995 | Hausman et al. | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/60 |
| 5,485,578 | 1/1996 | Sweazey | 395/200.11 |
| 5,490,139 | 2/1996 | Baker et al. | 370/60 |
| 5,490,252 | 2/1996 | Macera et al. | 395/200.01 |
| 5,490,260 | 2/1996 | Miller et al. | 395/427 |
| 5,493,564 | 2/1996 | Mullan | 370/54 |
| 5,500,860 | 3/1996 | Perlman et al. | 370/85.13 |
| 5,509,123 | 4/1996 | Dobbins et al. | 395/200.15 |
| 5,515,376 | 5/1996 | Murthy et al. | 370/85.13 |
| 5,517,488 | 5/1996 | Miyazaki et al. | 370/16 |
| 5,535,202 | 7/1996 | Kondoh | 370/60.1 |
| 5,550,816 | 8/1996 | Hardwick et al. | 370/60 |
| 5,553,067 | 9/1996 | Walker et al. | 370/60 |
| 5,555,405 | 9/1996 | Griesmer et al. | 395/600 |
| 5,557,610 | 9/1996 | Calamvokis et al. | 370/60.1 |
| 5,561,666 | 10/1996 | Christensen et al. | 370/24 |
| 5,561,791 | 10/1996 | Mendelson et al. | 395/550 |
| 5,563,878 | 10/1996 | Blakeley et al. | 370/60 |
| 5,566,170 | 10/1996 | Bakke et al. | 370/60 |
| 5,570,365 | 10/1996 | Yoshida | 370/85.6 |
| 5,572,522 | 11/1996 | Calamvokis et al. | 370/60.1 |
| 5,574,861 | 11/1996 | Lorvig et al. | 395/200.06 |
| 5,583,981 | 12/1996 | Pleyer | 395/326 |
| 5,592,476 | 1/1997 | Calamvokis et al. | 370/390 |
| 5,594,727 | 1/1997 | Kolbenson et al. | 370/442 |
| 5,600,641 | 2/1997 | Duault et al. | 370/400 |
| 5,602,841 | 2/1997 | Lebizay et al. | 370/413 |
| 5,606,669 | 2/1997 | Bertin et al. | 395/200.15 |
| 5,608,726 | 3/1997 | Virgile | 370/401 |
| 5,610,905 | 3/1997 | Murthy et al. | 370/401 |
| 5,615,340 | 3/1997 | Dai et al. | 395/200.17 |
| 5,617,421 | 4/1997 | Chin et al. | 370/402 |
| 5,619,500 | 4/1997 | Hiekali | 370/414 |
| 5,619,661 | 4/1997 | Crews et al. | 395/299 |
| 5,623,489 | 4/1997 | Cotton et al. | 370/381 |
| 5,633,810 | 5/1997 | Mandal et al. | 364/514 C |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/392 |
| 5,675,714 | 10/1997 | Aggarwal et al. | 395/200.12 |
| 5,684,800 | 11/1997 | Dobbins et al. | 370/401 |
| 5,689,506 | 11/1997 | Chiussi et al. | 370/388 |
| 5,689,518 | 11/1997 | Galand et al. | 371/37.1 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.2 |
| 5,724,358 | 3/1998 | Headrick et al. | 370/418 |
| 5,726,977 | 3/1998 | Lee | 370/235 |
| 5,734,651 | 3/1998 | Blakely et al. | 370/392 |
| 5,734,865 | 3/1998 | Yu | 395/500 |
| 5,740,171 | 4/1998 | Mazzola et al. | 370/392 |
| 5,740,175 | 4/1998 | Wakeman et al. | 370/422 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 395/200.02 |
| 5,745,048 | 4/1998 | Taguchi et al. | 340/870.01 |
| 5,748,631 | 5/1998 | Bergantino et al. | 370/398 |
| 5,748,905 | 5/1998 | Hauser et al. | 395/200.79 |
| 5,751,967 | 5/1998 | Raab et al. | 395/200.58 |
| 5,751,971 | 5/1998 | Dobbins et al. | 395/200.68 |
| 5,754,540 | 5/1998 | Liu et al. | 370/315 |
| 5,754,774 | 5/1998 | Bittinger et al. | 395/200.33 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,761,435 | 6/1998 | Fukuda et al. | 395/200.68 |
| 5,764,634 | 6/1998 | Christensen et al. | 370/389 |
| 5,764,636 | 6/1998 | Edsall et al. | 370/401 |
| 5,781,549 | 7/1998 | Dai | 370/398 |
| 5,784,559 | 7/1998 | Frazier et al. | 395/200.13 |
| 5,784,573 | 7/1998 | Sczczepanek et al. | 395/200.8 |
| 5,790,546 | 8/1998 | Dobbins et al. | 370/400 |
| 5,790,808 | 8/1998 | Seaman | 395/200.53 |
| 5,802,047 | 9/1998 | Kinoshita | 370/359 |
| 5,802,052 | 9/1998 | Venkataraman | 370/395 |
| 5,802,278 | 9/1998 | Isfeld et al. | 395/200.02 |
| 5,812,527 | 9/1998 | Kline et al. | 370/232 |
| 5,815,737 | 7/1998 | Buckland | 395/905 |
| 5,822,319 | 10/1998 | Nagami et al. | 370/392 |
| 5,825,767 | 10/1998 | Mizukoshi et al. | 370/395 |
| 5,825,772 | 10/1998 | Dobbins et al. | 370/396 |
| 5,835,491 | 11/1998 | Davis et al. | 370/386 |
| 5,838,677 | 11/1998 | Kozaki et al. | 370/389 |
| 5,852,607 | 12/1998 | Chin | 370/401 |
| 5,856,977 | 1/1999 | Yang et al. | 370/411 |
| 5,859,849 | 1/1999 | Parks | 370/395 |
| 5,872,783 | 2/1999 | Chin | 370/395 |
| 5,875,464 | 2/1999 | Kirk | 711/129 |
| 5,878,043 | 3/1999 | Casey | 370/397 |
| 5,878,232 | 3/1999 | Marimuthu | 395/200.79 |
| 5,892,912 | 4/1999 | Suzuki et al. | 395/200.48 |
| 5,931,980 | 11/1998 | Varma et al. | 370/395 |

( PRIOR ART )

FIGURE 2B

( PRIOR ART )

FIGURE 2C

( PRIOR ART )

TRUNKING ETHERNET-COMPATIBLE NETWORKS

FIELD OF THE INVENTION

This invention relates to networks in general including Ethernet networks, and more specifically to trunked Ethernet and Ethernet-compatible networks.

BACKGROUND OF THE INVENTION

A network is a communications facility that permits a number of workstations, computers or other equipment (hereinafter collectively "computer(s)") to communicate with each other. Portions of a network involve hardware and software, for example, the computers or stations (which individually may comprise one or more central processing units, random access and persistent memory), the interface components, the cable or fiber optics used to connect them, as well as software that governs the access to and flow of information over the network. In networks in which data flow is 100 Mbits/sec. ("Mbps") or higher, the transmission medium is often fiber optics. In networks in which a slower data rate is acceptable, e.g., 10 Mbps, the transmission medium may be coaxial cable or, as is often the case for an Ethernet network, twisted wires.

In a network, network architecture defines protocols, message formats and other standards to which the computers and other equipment, and software must adhere. Most network architectures have adopted a model comprising functional layers in which a given layer is responsible for performing a specific set of functions, and for providing a specific set of services. Thus, the services provided by each layer and the interlayer interfaces can define a network architecture. Protocols define the services covered across a layer interface and the rules followed in the processing performed as a part of that service.

Several organizations have proposed models and standards that have been accepted within the networking community. The International Standards Organization ("ISO"), for example, has proposed a seven layer reference model for computer networking that is called the open systems interconnect ("OSI") architecture. Another set of standards has been promulgated by the Institute of Electrical and Electronics Engineers ("IEEE") set of proposed local area network ("LAN") standards known as IEEE Project 802. This model conforms to the seven-layer OSI model, but directly solely to the lowest two OSI layers, namely the physical layer and the data link layer.

Figure 1A:
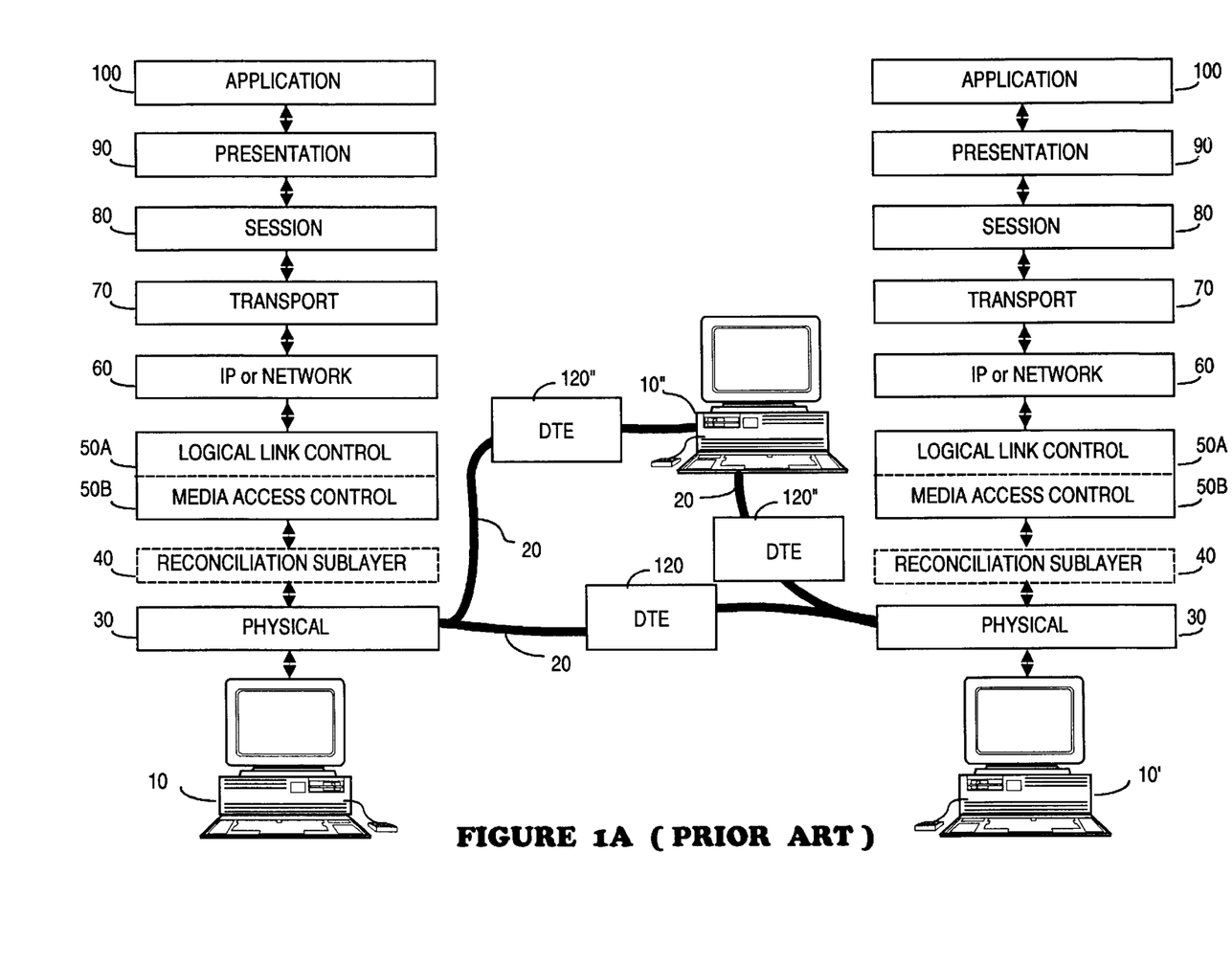
FIG. 1A depicts a network and model, according to the prior art.

FIG. 1A depicts a network according to the IEEE Project 802 modification to the ISO seven layer model, in which several computers 10, 10', 10" can communicate data to each other over a physical link medium 20, e.g., cable, typically via a data terminating equipment unit ("DTE") 120, 120', 120". Any or all of the DTEs may be a switch, a router, another computer system, etc. In practice, a network may include hundreds or thousands of computers. In FIG. 1A, it is understood that associated with computer 10" (or equivalent) is a similar seven layer ISO model.

The bottommost, first or "L1" layer 30 in both the ISO and Project 802 model is a physical layer that is concerned with connections between two machines (e.g., computers 10, 10') to allow transmission of bit streams over a physical transmission medium (e.g., cable 20). Thus, physical layer 30 is concerned with types of cabling, cable plugs, port connectors, and the like. Often a server will have up to fifty physical port connectors, although more modern units such as the Sun Microsystems, Inc. Enterprise model 10,000 server has accept 100 physical links, each having 100 Mbit/sec. flowrate.

Many Ethernet networks adhere to a carrier sense multiple access with collision detection ("CSMA/CD") standard. In the 802 model for CSMA/CD, a reconciliation interface 40 defined by a Media Independent Interface ("MII") standard exists for the reconciliation sublayer 40 interface between physical layer 30 and a media access control ("MAC") sublayer 50B.

Under MII, data and delimiters are synchronous to the corresponding clock, and two asynchronous media status signals are provided, namely carrier sense ("CRS"), and collision ("COL"). MII provides a two wire serial management interface for control and status gathering, namely management data clock ("MDC"), and management data input/output ("MDIO"). In the OSI seven-layer model, the layer above the physical layer is a data link layer that is responsible for error-free transmission of data frames between network nodes. A data link control protocol describes operation and interfaces of this layer, which must also shield higher layers in the model from concerns about the physical transmission medium.

In the 802 model shown in FIG. 1A, the data link layer is subdivided into MAC layer 50B and an overlying logical link control ("LLC") layer 50A, collectively a second or L2 layer. The media access control sublayer is concerned with access control methods to determine how to control the use of the physical transmission medium. The LLC sublayer 50A is responsible for medium-independent data link functions and allows the network (or internet protocol, "IP") layer 60 above to access LAN services independently of how the network is implemented. The network or IP layer 60 is often referred to as layer 3, or L3. According to the 802 architecture, LLC sublayer 50A provides services to network 60 in the same fashion as would a conventional data link protocol in a wide area network.

The MAC sublayer 50B provides services to the overlying LLC sublayer 50A, and manages sharing of the transmission medium among the different stations on the network. A media access management function receives a frame from the data encapsulation function after the necessary control information has been added. Thereafter, media access management is responsible for ensuring physical transmission of the data. The data frame in an Ethernet full-duplex environment has a maximum size of 1,518 bytes.

Several 802 standards exist for MAC sublayer 50B, including the so-called carrier sense multiple access with collision detection ("CSMA/CD") standard, and the 802.3 MAC standard provides flow control mechanisms in a half-duplex environment. In such environments, CSMA/CD defines data encapsulation/decapsulation and media access management functions performed by MAC sublayer 50B itself, the data encoding/decoding function being performed by underlying physical layer 30. However, as described later herein, the present invention assumes full duplex operation at the physical and media access control layers 30, 50B for each segment of a trunk.

Physical transmission of the data may be ensured using carrier sensing to defer transmission until the network is clear. In brief, a transmitting station (e.g., computer or user 10) listens or monitors the transmission medium (e.g., cable 20) before transmitting to determine whether another station (e.g., computer or user 10') is currently transmitting a message, e.g., to learn whether the medium is free. Using the services of the L1 physical layer 30, the media access management determines whether the transmission medium (or carrier) is presently being used. If the medium is not being used, media access management passes the data frame to L1 physical layer 30 for transmission. Even after frame transmission has begun, media access management continues to monitor the carrier. If the carrier is busy, media access management continues monitoring until no other stations are transmitting. Media access management then waits a specified random time to allow the network to clear and thereafter begins transmission.

But other station(s) having messages to send may all listen simultaneously, discern that the transmission medium appears quiet, and begin to transmit messages simultaneously. The result is a collision and garbled messages. If signal collision is detected, receiving stations ignore the garbled transmission, transmitting stations stop transmitting messages immediately and transmit a jamming signal over the medium. Following collision, each transmitting station will attempt to re-transmit after waiting for a random backoff-delay time period for the carrier to clear. Thus, a station transmitting must listen sufficiently long to ensure that collision has not occurred.

In FIG. 1A, network or IP layer 60 concerns the routing of data from one network node to another. It is the role of network layer 60 to route data between network nodes. Transport layer 70 provides data transfer between two stations at an agreed upon level of quality once a connection is established between the stations. Transport layer 70 selects the particular class of service to be used, monitors transmission to ensure maintained service quality, and advises the stations (or users) if quality cannot be maintained.

Session layer 80 provides services that organize and synchronize a dialogue occurring between stations, and manages data exchange between stations. As such, session layer 80 controls when stations can send and receive data, based upon whether they can send and receive concurrently or alternately.

Presentation layer 90 ensures that information is presented to network users meaningfully, and may provide character code translation services, data conversion, data compression and expansion services.

Application layer 100 provides a mechanism for application processes to access system interconnection facilities for information exchange. The application layer provides services used to establish and terminate inter-user connections, and to monitor and manage the interconnected systems and the resources they employ.

Although the network shown in FIG. 1A may be half-duplex (or shared), or full-duplex, with respect to the present invention full-duplex only will be assumed. In full-duplex, there are transmit and a receive communications paths, and one or more stations may transmit and receive simultaneously. The dual communications channel or path may in fact be multiple wires or cables, or a single wire or cable that simultaneously carries transmit and receive signals in both directions, perhaps using frequency division. Full-duplex networks can provide a higher data rate than half-duplex networks, often 100 Mbps, and are often preferred because of the more rapid communication rate. Historically, network communication link speeds have increased: 10BASE-T links have given way to 100BASE-T links, which are now being scaled to transmission rates of up to 1 gigabit/second (1000 Mbps) with 1000BASE-T links. But in practice the choice of link speeds (e.g., 10 Mbps, 100 Mbps, 1000 Mbps) may not well match the amount of sustained data throughput that a particular network device can support. For example, modern multi-processor servers can sustain greater than 100 Mbps aggregate network transfer rates. Further, when switches and high performance routers are used to interconnect multiple links of a given transmission speed, it is necessary and desired that the inter-switch or inter-router link be able to support at least some aggregation of the links. Enhancing a network link speed from say 100 Mbps to 1000 Mbps is hardly cost effective unless utilization of the higher speed link is enhanced substantially, e.g., perhaps 40% to 50%, or more. Increasing network link speed also requires new hardware.

In FIG. 1A, cable media 20 is an Ethernet-compatible cable and will include a plurality of separate wires. As noted, a host, e.g., computer 10, typically will have a plurality of output port connectors (fifty, perhaps), that each accommodate a separate physical cable whose other end will connect to a switch 120 or other DTE. Collectively, the separate wires connecting host 10 to DTE 120 will define a single link of Ethernet-compatible cable, even though multiple wires are present within the cable.

Figure 1B:
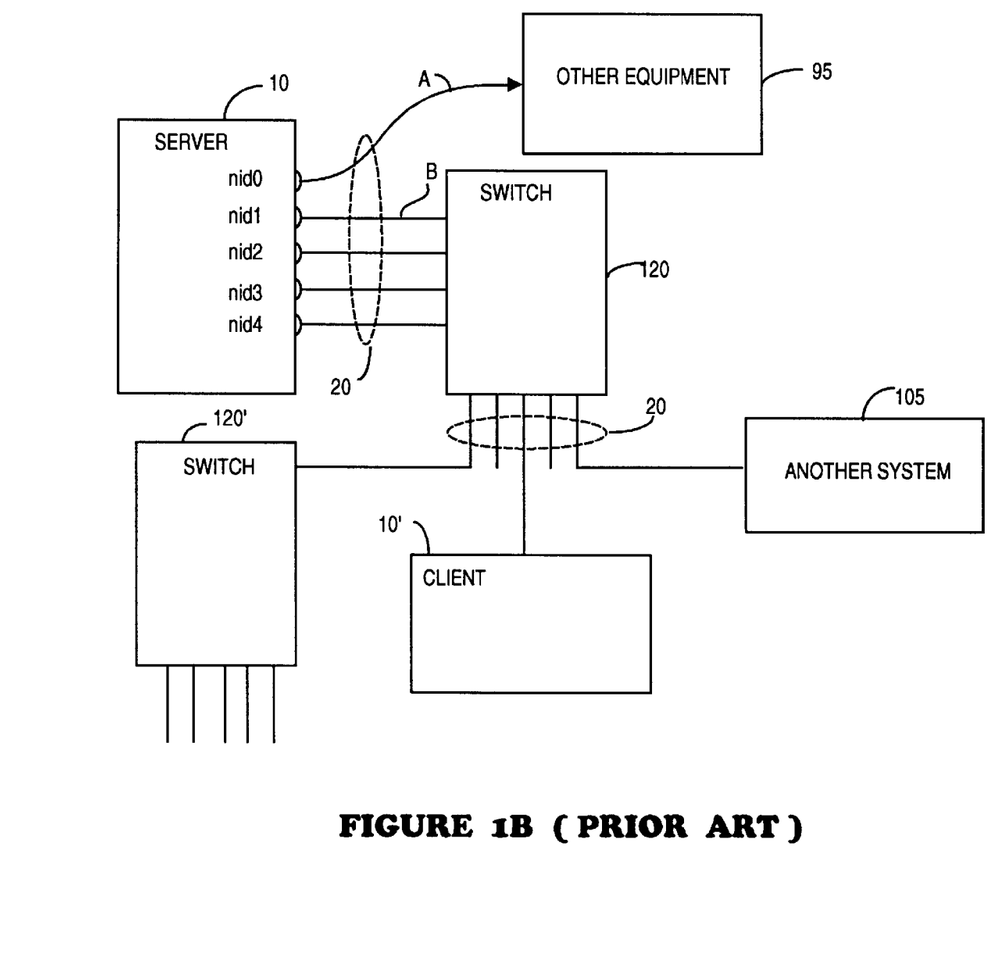
FIG. 1B depicts typical network system connections, with which the present invention may be practiced.

FIG. 1B depicts server 10 with a plurality of output connector ports, here denoted by their network ID numbers, nid0, nid1, nid2, . . . nid4. of course there may be fifty or more of such ports and associated network Ids. The link associated with nid0 is shown physically connected with other equipment 95, the precise equipment and terminating destination being unimportant. A plurality of physical links within cable 20 are shown as terminating at a DTE 120, here a switch. Other ports on switch 120 are shown as having physical links connecting to, for example, yet another system 105, as well as to a client 10', and another DTE 120'.

The operating system associated with server 10 in FIG. 1B must treat each of the server connector ports (or the physical cable links connected thereto) on an individual basis. Assume for example that equipment 95 is to be physically relocated from the port position associated with nid0 to some other output port on server 10. To accomplish this, the system administrator must assign a new IP-level address for relocated equipment 95, because cable link A will no longer be used, and a new cable link will be used instead, terminating at a different output port on server 10. Similarly, if cable link B coupling the server output port associated with nid1 to a first input port of switch 120 were down, e.g., broken or defective, no data would be presented to that input port of switch 120 until cable B could be repaired or replaced. There is no automatic re-direction of data to preserve system throughput in the prior art configuration shown.

In FIG. 1B, for server 10 to transmit data to client 10', the system administrator would have first had to configure the system such that client 10' is on one of the plurality of sublinks associated with switch 120. In transmitting packet information, server 10 would specify an IP-level sub-link address (associated with IP layer 60) corresponding to one of the links to which client 10' was assigned. As is common, the IP level sub-link address would have two ports: a network ID and a host ID. However each IP-level sub-link address has a different network IP level address associated with it (see also FIG. 4B). Understandably, if too many clients seek to use the same IP address, then excess data traffic would attempt to flow through a single link, potentially congesting the network system.

The network administrator will have used a common network level ID for the IP-level address associated with one of the group of links, to which client 10' is dedicated, or bound. One undesired result is that because client 10' DTE and its physical link are bound, the system administrator cannot readily or flexibly group together any arbitrary number of physical links. The network or IP-level three addresses were denoted nid0, nid1, ... nidN (see also FIG. 4B). In the prior art, link grouping is such that sub-links may be denoted at level two with addresses nid1.1, nid1.2, nid1.3, and so forth. To communicate with a piece of equipment, e.g., client 10', that is associated with a group of sub-links including nidi, it would also be necessary to specify which link is involved, e.g., linkage 3, denoted nid1.3.

Thus, software wishing to send information from server 10 to client 10' in FIG. 1B must specify the unique destination address as nid1.3. This is because the software application must communicate with level two via level three (see FIG. 1A and FIG. 4B). In essence, level three is software-commanded to send the data packet to address nid1.3.

Layer three information must be communicated to layer two so as to be understandable to layer two, which understands only its own addressing protocol. Thus, layer three will include a server-maintained mapping function that translates nid1.3 into a physical (e.g., MAC/LLC) address that is meaningful at the network level two layer. In practice, the server causes its layer three to maintain a mapping table (using address protocol or ARP information) for each network level ID that is a local link corresponding to an Ethernet ID. In essence, a vertical link level three-to-MAC address level two mapping results for the network ID in question. A separately maintained protocol table will contain an entry for nid1.3 (among other entries) as well as its associated MAC/LLC address. The map-reported particular MAC/LLC address will be and indeed must be used to send the packet in question to client 10'. Unfortunately in a switched network such as has been described, the packets in question have no alternative route to client 10' except this particular MAC/LLC address. For this reason, the addressing system is described as being static.

Figure 2A:
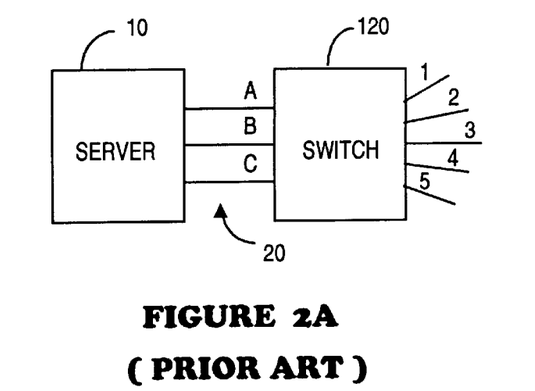
FIGS. 2A–2C exemplifies various link configurations with which the present invention may be practiced.

FIGS. 2A–2C depict various network interconnect configurations. In FIG. 2A, three separate wire link segments A, B, and C are included within media 20, and are used to couple a DTE, here server 10, and a switch 120 (or other mechanism). Of course more or fewer than three wire link segments could be used, depending upon the amount of bandwidth required for the system. Switch 120 is also coupled to several client segments, denoted 1, 2, 3, 4 and 5. In this configuration, server 10 may be replaced with other types of equipment, e.g., a router, a high performance workstation, a printer, etc.

Figure 2B:
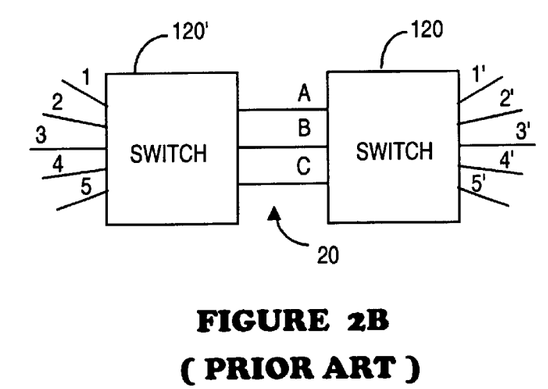
Figure 2C:
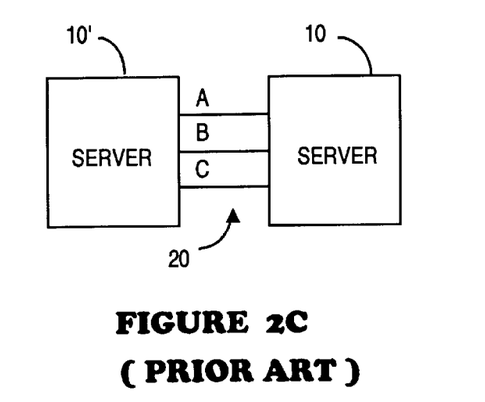

In the embodiment of FIG. 2B, three wire link segments A, B, and C connect switch 120' to switch 120, although again a different number of segments could instead be used. In FIG. 2C, three segments (A, B, C) couple serves 10' to server 10, although one or both servers could be replaced with other equipment, a router, for example.

In the prior art systems, accommodating configurations of FIGS. 2A or 2B or 2C typical requires layer 60 to assign to 10 each of the three wires A, B, C, within link 20 a separate IP address. (If multiple clients were to use the same IP address, all of their data traffic would pass on a single link, congesting the system.) Thus, administratively, three internet addresses would be required to handle the three (exemplary) wires within link 20. Network software would then treat each of these links as three different links. In practice, there may be fifty or more separate wires (e.g., A, B, C, ... ) within a physical link 20, and administratively having to assign and handle separate internet addresses for 20 each is burdensome.

For example, in a system having multiple Ethernet links from a server/host system that are connected to an Ethernet-compatible network using an Ethernet switch, the system administrator must statically assign a different ID address (e.g., assign different IP host names) to each link, and also must configure each link with a different MAC address. In addition to being time consuming, the network administrator must also group other host/client systems into different IP sub-nets so that the multiple links can share network data traffic to the server. This grouping of clients into an associated logic group is required because certain clients would have to use one IP address to access the server since one cable is used.

Unfortunately, if a client or DTE had to be relocated within the system, it would now use a new cable coming from the server, and its relocation would require the system administrator to assign a new IP address. The various clients (or other DTE) are distributed at the receiving end of the system, and if the IP address reassignment were not carefully done, too many clients might end up using the same IP address. This could readily result in excessive traffic attempting to pass through a single physical link, congesting the system and degrading system bandwidth. Further, if a physical link were damaged or disconnected, a client whose dedicated IP address involved that link would lose access to the server, there being no other access path. Data intended to go to or from such a client would be lost.

Thus, in prior art network configuration protocols, for each physical link the administrator must statically assign a separate level 3 IP layer address and a level two LLC/MAC layer 50A/B address. Because DTE units are statically associated with a link in a group of links, e.g., in a sub-link, an IP layer sub-link address is required.

To summarize, in an Ethernet-compatible network there is a need for a flexible and dynamic method to allow multiple physical links to be logically grouped into a single logical or virtual link. In such a system, the system administrator should be able to assign a single LLC/MAC layer 2 address, and a single IP layer 3 address to the resultant virtual link. Such a system should permit grouping together into a single trunk any arbitrary number of physical links. The resultant system should provide flexibility to the system administrator in terms of rapidly reconfiguring the network system.

Such reconfiguration ability should improve load balancing and the maintenance of speed network system throughput, and should permit flexible reassignment of data flow traffic to a different physical link in the event there is disruption or failure of data flow through a used physical link. Further, such a system should logically preserve the flow sequence of data packets carried by the network between two communication points. Further, when a previously failed physical link again becomes available, the system should then use such link to help share data flow load over the network trunk.

The present invention provides such a methodology for use in an Ethernet-compatible network system.

SUMMARY OF THE PRESENT INVENTION

In an Ethernet-compatible network, servers and hosts are connected through DTEs, e.g., a switch, using a cable (or equivalent) that carries a plurality of separate wires (or links). Using a rule set, an arbitrary number of the multiple links (or server connectors) are trunked so as to be representable to higher network layers as a single logical (or virtual) link. Such virtual link is assigned one MAC address and one IP address, notwithstanding that a plurality of separate physical links are included and represented. (This is in contrast to prior art techniques in which each connector or link would require a dedicated IP address.)

A virtual link permits system network administration to flexibly and dynamically reassign equipment location without attending to tedious re-addressing tasks. Equipment movement, perhaps because of a link loss, is readily accommodated, and even though a different physical link is used after the move, the moved equipment logically remains within the same virtual network. This flexibility is in contrast to prior art methods in which each separate link in the cable is dedicated and must be configured with its own MAC address and IP address.

The present invention logically represents N discrete physical information channels, each bearing a unique physical address, as a single virtual information channel bearing a single virtual address. A trunking pseudo-driver software layer is introduced between the IP (or network) layer and the device driver portion of the physical layer, in the Ethernet-compatible network model, solely on the server side. (The client or recipient side is unchanged.) In transmitting packets from a server across the plurality of physical links, load distribution is handled by trunking device driver code within the server. The pseudo-driver code algorithm ensures that transmitted packets are distributed to preserve logical flow order between the two communication end points traversed by the physical links. Physical link failure is accommodated by reassigning traffic to surviving links, and directing at least a portion of packet load to a failed link only when the link is returned to service.

The present invention uses the same information that would otherwise be available to layer three and layer two in deciding what packet address information to send. However, whereas prior art techniques rely upon a vertical mapping link between layer three and layer two, the present invention constructs destination MAC addresses using conventional map-table information, its own source MAC address, and a packet ID that points to layer three. In a level three-to-level two communication, the present invention makes a plurality of level-two links appear to level three to be a single virtual link or device. In contrast to multiple level IP-level three addresses, one per each lower level link, the IP-level three layer in the present invention sees a single virtual or logical device.

The present invention modifies host layer two to provide soft-ware-implemented drivers having augmented configuration capability. The device driver issue packets with address information that specifies the device corresponding to each link, including trunk-level ID. This information is used locally at the recipient. Because the information packets carried to the recipient are not otherwise different, the recipient is unware that it is communicating with a trunked link.

The present invention assumes that a trunk may have an arbirary number of segments, each of which has identical full-duplex duplex operating physical layer and media access control layer characteristics, and each of which shares a common source and destination with other trunk segments. Temporal ordering of information packets transported across a given trunk segment is preserved throughout the network, and any broadcast or multicast packets are not echoed or transmitted back. Load balancing is promoted by hashing destination MAC addresses and then selecting an appropriate protocol link to which packets will be addressed and sent.

Other features and advantages of the invention will appear from the following description in which the preferred embodiments have been set forth in detail, in conjunction with the accompanying drawings.

DETAILED DESCRIPTION OF THE PREFERRED EMBODIMENT

The present invention simplifies network system administration and promotes system bandwidth without substantially increasing dollar or performance cost by employing a new form of trunking. Trunking may be defined as the ability to combine multiple parallel physical links into one logical (or virtual) channel. As used in the present invention, trunks will be limited in that physical links (e.g., media 20) share a common source and a common destination. Further, in such trunks, each of the links (or trunk "segments") are assumed to have substantially identical physical layer 30 and LLC/MAC layer 50A/B characteristics.

Referring again to FIGS. 2A–2C, physical media 20 includes a plurality of physical links or segments, e.g., wires A, B, C. The present invention operates to make that plurality of physical links or segments appear to be a single logical or virtual link, from the perspective of higher level network layers in the model of FIG. 1A. The ability to treat a plurality of physical links as a single virtual link can greatly simplify the task of network system administration, and can also contribute to flexibly increasing and maintaining network bandwidth. Administratively, the network system can use a single IP address and a single Ethernet address for one logical (or virtual) link, even though the link includes a plurality of physically separate cables or segments.

According to the present invention, within a trunked network operating system, a link is assigned (or is associated with) a single identification (ID) address and a single MAC layer address. One desired result is that a physical cable (or equivalent) comprising a plurality of separate links appears to higher network system levels as one virtual or logical entity, an entity to which IP layer 60 can assign an single IP name.

One advantage of such virtual link referencing is that a higher effective network bandwidth capacity can be flexibly realized. For example, in a network system with ten 10 Mbps links, logically grouping the ten links can produce the throughput of a 100 Mbps link. Of no less importance from the standpoint of a network systems administrator, the addressing benefits provided by the present invention provide great system reconfiguration flexibility.

In implementing the present invention, a rule set is defined to which equipment on each end of a trunk must adhere. The rules are symmetric in that each end of the trunk must obey the rules. Further, the rules apply to end stations including DTEs, computers of any classification, etc., and also apply to network infrastructure components (e.g., switches especially).

The rule set is as follows:

1. A trunk may have any number of segments, but all segments must have identical physical layer and media access control layer characteristics;
2. Each trunk segment must share a common source and a common destination with other trunk segments;
3. Temporal ordering of information packets transported across a given trunk segment must be preserved throughout the network, subject only to loss due to bit errors;
4. Temporal ordering of packets transported across different segments of the trunk can not be assumed;
5. Packets (including broadcast and multicast packets) must not be replicated or duplicated across trunk segments;
6. Broadcast and multicast packets transmitted through a trunk segment must not be echoed or looped-back to the sender over the other trunk segments;
7. The rules are based upon a model that assumes full-duplex operation at the physical and media access control layers for each segment, and half-duplex operation, using CSMA/CD is neither supported nor desired;
8. Trunk end stations will associate a single 48 bit IEEE MAC address with all trunk segments;
9. Perfect load balancing across segments can not be assumed, and each trunk end will attempt to load balance across the segments to the best of its ability, subject to all of the forgoing rules.

The above rules do not per se address trunk configuration, setup, management, or maintenance, address failure detection or recovery. The present invention assumes that the physical layer will provide some indication should a particular trunk segment fail. Further, the present invention assumes that each trunk end monitors whatever status is provided by the physical layer, and takes appropriate action. In practice, configuration and setup may be performed via manual operations specific to each implementation, although non-manual operations may instead be used.

From the server perspective, the present invention imposes control over how data flows out, but imposes no control as to how data might arrive. Further, while the server provides a client ID assignment at the device driver level for the logical link, the switch (or other) mechanisms with which the present invention is used must understand the virtual nature of the linkage involved. Thus, the mechanism should realize that although what is seen appears to be an aggregated single link, that the link is a logical link and may involved ten wires that are coupled to ten switch poles. Thus, the switch or other mechanism should know how to distribute traffic from the server to the mechanism preferably evenly among these various links. Typically, switch and other DTE mechanisms are microprocessor controlled and can readily be made to configure a set of ports as a single logical link.

An important goal in a trunking model is to make even a multi-segment trunk appear to be a single high bandwidth interface from the viewpoint of the server's protocol stack. Further, all clients that communicate with the server via the trunk should have a consistent view of the server's identity, e.g., of the MAC and internet-physical or IP host addresses.

Applicants have avoided attempts to achieve load balancing by managing address resolution protocol (ARP) tables within the client. Such an approach is not desirable because the server would have to emit too many ARP frames, and because the server ARP implementation would have to be substantially augmented in terms of functionality.

The fourth above-enumerated rule precludes assuming temporal packet ordering in transporting packets across different trunk segments. Accordingly, the server must ensure that all packets in any sequence of packets that requires temporal ordering are transmitted over the same segment of the trunk. In general, transport protocols can recover from situations where packets arrive out of order, but recovery generally entails a significant degradation in throughput. This is because out of order packet reception is treated as an exception, and is not optimized. Accordingly, any server load balancing mechanism should be designed to take advantage of the third rule, namely that temporal ordering of packets transported across a given segment of the trunk must be preserved throughout the network, subject only to loss due to bit errors.

Figure 3:
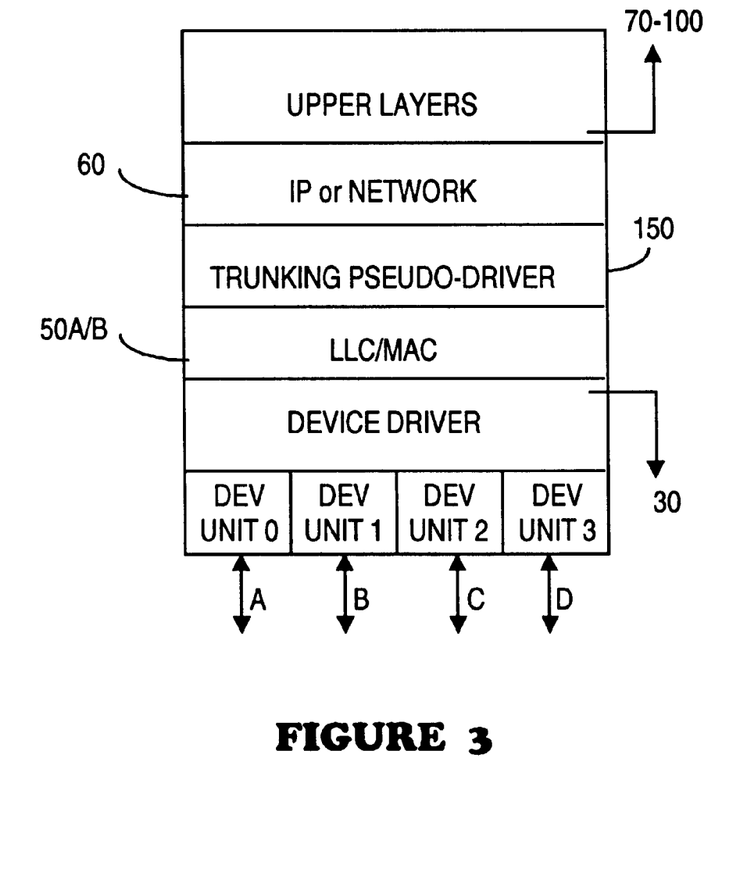
FIG. 3 depicts a modification to the network model of FIG. 1A, according to the present invention.

FIG. 3 depicts the relatively slight modification to the lower levels of the model shown in FIG. 1A for a full-duplex switched environment Ethernet-compatible network, used to implement the present invention. Note that relevant changes occur below the third model layer, IP or network layer 60.

More specifically, a trunking pseudo-driver layer 150 is introduced below IP layer 20 and above LLC/MAC layer 50A/B. The first or physical layer 30 now includes software device drivers, denoted here device unit 0 . . . device unit 3, one such driver being provided for each physical wire A, B, C, D attached to the equipment in question, e.g., workstation 10. Because only slight changes are made to the underlying network model, the resultant network is fully IEEE 802 compatible.

In the trunked server interface of FIG. 3, pseudo-driver layer 150 functions as a de-multiplexer in the transmit path, and a multiplexer in the receive path. To satisfy the above enumerated rules regarding temporal ordering, the pseudo driver will attempt to ensure that all of the packets associated with a particular transport layer datagram are enqueued on the same network device transmit queue. This assumption is made on the basis that ordering within a datagram is sufficient, and that ordering between datagrams is unnecessary.

Figure 4A:
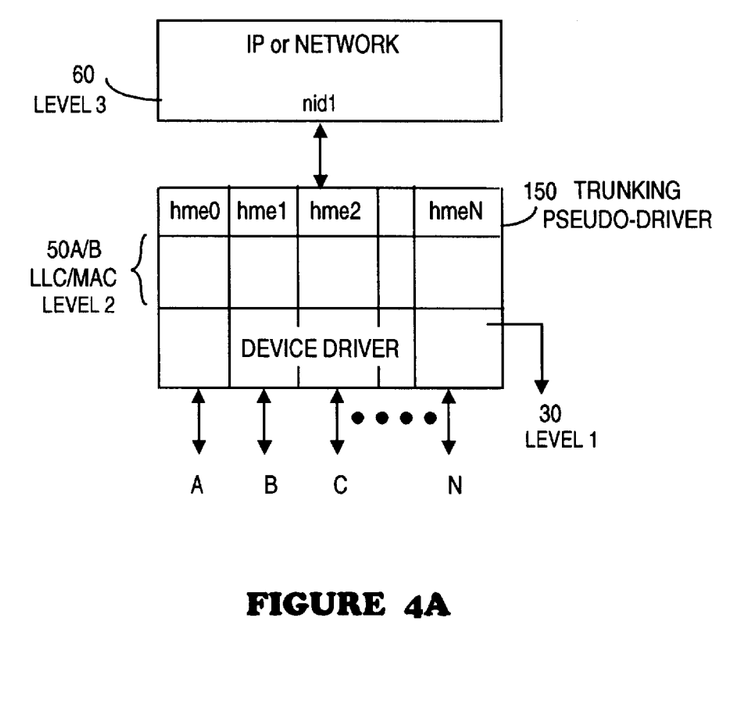
FIG. 4A depicts the effect of layer modification, according to the present invention.
Figure 4B:
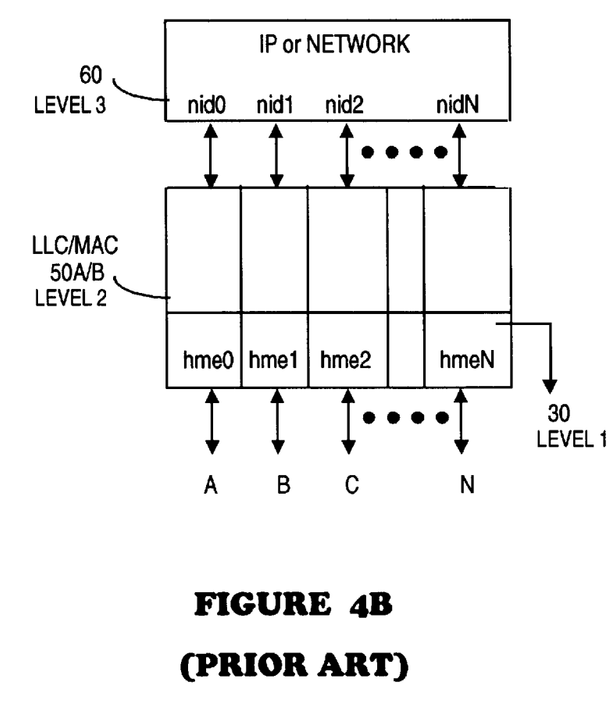
FIG. 4B depicts an unmodified layer, according to the prior art.

FIG. 4A depicts the effect of the modification suggested by FIG. 3, and is to be contrasted with FIG. 4B, which depicts a conventional, unmodified, IP layer 3, LLC/MAC layer 2 interface. In FIGS. 4A and 4B, ultimately a plurality of clients (or equivalent), denoted A, B, C, . . . N, are served by a server, whose layer 3-layer 2 is shown. However, by slightly modifying the layer two-layer three interface at the server side only, the present invention advantageously allows each client A, B, . . . N, to belong to a single subnet, referenced to IP layer 3 via a single IP (or Ethernet) level address, here depicted nid1. In essence, the present invention operates peer-to-peer at level two, by including MAC address information on out-going packets. (By contrast, prior art addressing requires a vertical layer three ARP table-to-layer 2 translation because each physical link is dedicated to a network ID address.)

To the operating system associated with the client of FIG. 4A, the N separate system connectors or cables appear to be a single logical link. Administratively, the N pieces of equipment coupled to the server of FIG. 4A may be flexibly linked to promote higher system bandwidth. If, for example, there are N 10 Mbit/sec. links, they can be grouped logically to represent an N×10 Mbit/sec. system. System administration is especially simplified with respect to repositioning pieces of equipment, e.g., moving a DTE from "location" A to location "C" in FIG. 4A, or permitting a DTE at location C to receive data even if the physical link that would normally have been used is down.

By contrast, note in prior art FIG. 4B, there is a separate IP (or Ethernet) level address for each client, e.g., link nid0 for client A having driver hme0, link nid2 for client B having driver hme2, and so forth. (See also FIG. 1B.) In FIG. 4B, the various clients or devices (denoted A, B, . . . N) are grouped into N sub-nets with reference to interfacing between level two and level three. Note too in FIG. 4B that associated with the IP level three layer and the LLC/MAC level two layer are N network level IDs (nid0, nid1, . . . nidN) and N device names, hme0, hme1, . . . hmeN, each device name representing a single physical link. As noted, in prior art FIG. 4B, IP layer three must recognize a separate network ID address for each physical link.

Consider now the addressing benefits obtained with the present invention. Packets of data incoming to a mechanism (e.g., a switch) carry address information, including a network level 2 destination address and a trunk ID address. Commonly, the destination address is absolutely unique in that no other Ethernet-compatible port in the world will have the same destination address. The destination address is 6 bytes long, the source address is 6 bytes long, and 2 bytes are used to identify the type of packet (e.g., standard or fast Ethernet) to be carried by the physical link from server to mechanism.

Trunking according to the present invention avoids packets having to carry multiply different Ethernet level destination addresses. Thus, according to the present invention, a switch coupled to receive five input links will not require five separate six byte destination addresses for each of the links.

In addition to assigning a preferably six byte level two destination address, the present invention also assigns a level three address. However, whereas the prior art requires one level three internet address for each level two Ethernet address (FIG. 4B), the present invention functions with a single level three address for a plurality of level two addresses (FIG. 4A). In this fashion, the plurality of level two linkages (or sub-links) are representable as a single virtual link to layer three and higher layers in the network model. The host or server-side layer two is modified to include software device drivers with augmented configuration capability. The modified layer two issues commands to a pseudo-device driver layer, specifying a device corresponding to each link. The relevant trunk is software identified with a trunk ID.

Referring again to prior art FIG. 4B, each of the N sub-links (e.g., A, B, . . . N) will have at level three a different sub-link IP address. If there were N=5 links, then five different level three sub-link IP addresses would be required. If a host server 10 wished to send data to a client 10' (or other equipment), server 10 would be required to specify an appropriate IP sub-link address that corresponded to the specific link to which client 10' were assigned. Thus, for server 10 to specify client 10', server 10 at IP level three would specify a unique IP address having host ID and network ID. As noted, when the network administrator configured the network, the network level ID assigned for client 10' will be the same as the IP level address that is associated with client 10', because the associated physical link is bound to this client. By contrast, as shown in FIG. 4A, a single virtual link spanning layers three and two can represent a plurality of lower level links.

In practice, it would be difficult for the software code implementing the pseudo driver to inspect headers of each packet and attempt to associate them with a particular datagram. However, given a sufficiently fast processor to execute the code, this could be accomplished. It appears sufficient to maintain a small cache of MAC (or IP) destination addresses associated with each network interface, e.g., with each segment of a trunk. Such cache may be maintained in any of stations 10, 10', 10", etc. (see FIG. 1A), as would be the software code and processor executing such code.

Thus, when the IP layer hands the pseudo driver a packet, the pseudo driver inspects the cache to learn whether it has recently transmitted a packet to the relevant destination address ("DA"). If yes, the pseudo driver will enqueue the packet on the same interface used to enqueue the last packet to this DA. If there has been no recent transmission to this DA, the pseudo driver can either enqueue the packet on the most empty (e.g., least busy) transmit queue, or on the next available queue, e.g., in a round robin fashion. Regardless of the queue it selects, the pseudo driver must update the cache for that queue with the new DA.

Consider now the degenerate case in which a server talks to one and only one client. The present invention still ensures that all packets for that client traverse over the same interface, and hence over the same segment of the trunk. Load balancing is achieved in that the present invention works even better in a non-degenerate case. An ordered delivery of packets is ensured, providing one can assume the degree of interleaving of packets to different DAs between the IP and the network driver is of the same order as the number of processors within a given multi-processor server. As a guide, the cache depth should approximate twice the number of processors within a given server. Of course, as cache depth is increased, cache updating can be somewhat more casual. There may in fact be an optimal cache depth value, as well as an optimal distribution of amount of layer 2 and layer 3 addresses to be cached.

Several switch load balancing mechanisms may be used to forward packets into a trunk. Consider now load balancing among network DTEs such as switches, for which the following set of load balancing guidelines is applicable for switch-to-server trunks (e.g., FIG. 2A), and for switch-to-switch trunks (e.g., FIG. 2B). These guidelines are intended to ensure that switch behavior is consistent with conventional bridging guidelines. The guidelines are as follows:

1. No frame mis-ordering should occur for a given priority level between a given MAC source and destination;
2. No frame duplication should occur;
3. Load balancing should be transparent to protocols operating above the MAC layer.

One load balancing approach is to emulate a faster link by keeping all trunk segments equally busy. For example, the corresponding output queue could be used as the metric for the load of the segment. Providing the links implement flow control, output queue length is a good end-to-end proxy for the segment utilization. (Without flow control, a high segment load would not necessarily be reflected in the state of the output queue, due to packet loss at the other end on the receive queue.)

However using queue length solely to decide what segment to use on a per packet basis could result in frame mis-ordering, in contravention of the first above-enumerated guideline. However, the first guideline will always be satisfied if the segment decision is made solely as a function of source address of the packet, or of the packet's port of arrival. This approach, however, results in a static load balancing function in which trunk effectiveness depends upon distribution of the traffic sources. On one hand, a large number of traffic sources should promote a result having acceptably even distributions. But on the other hand, one might still end up with configurations whose mapping function forwards a substantial amount of traffic to the same segment, which would promote system congestion.

A preferred approach is to implement a dynamic mapping function, while still maintaining frame ordering. This approach assumes that function changes occur more slowly than output queue transit times. By way of example, mapping for a given source address can be determined at the time the first packet with the source address is seen. The mapping can eventually be aged after the source address goes unseen for a sufficient period of time.

Preferably the mapping function considers both the source address and the port of arrival, to reduce the number of pathological cases. For example if traffic is spatially dominated by a particular input port, considering the source address will help spread its traffic. Conversely, considering the port of arrival helps distribute traffic dominated by a small number of addresses (e.g., servers or routers), especially if more than one trunk exists in the switch.

Frame duplication is prevented by treating the set of trunked ports as though they were a single port, with a separate queue per segment, and by ensuring that all forwarding is to only one of the queues. Furthermore, trunked ports are also treated as if they were a single port for purposes of other IEEE 802.1(d) functions such as learning MAC addresses, filtering frames, and executing any applicable spanning tree protocol.

Thus far, the above description has concentrated upon load balancing using MAC layer information. It is also possible for a network switch to observe higher level protocol information to make better load balancing decisions, providing the third guideline (re protocol transparency) is followed. Transparency implies that protocols are not aware of and do not explicitly cooperate with the switch load balancing function. In addition, connectivity must still be guaranteed for protocols that are neither supported nor understood by the switch.

It is practice to implement load balancing based on higher level information for switches that examine Layer 3 headers on a packet-by-packet basis. For example, in VLAN configurations, switches can examine layer 3 headers once and use the corresponding layer 2 information for packet processing. However, applicants have not fully considered potential load balancing performance of such an approach.

Although the foregoing descriptions have been directed to providing a mapping function that promotes equal balancing among segments, the mapping function could be directed otherwise. For example, the mapping function could separate traffic according to priority, or according to whether the traffic is bandwidth managed, or according to best effort. A priority based approach is supported by the first enumerated guideline (no frame mis-ordering) because it is not necessary to preserve packet order across different priorities. A priority based approach is especially straightforward when priority information is well defined at the MAC level, as is the case if VLAN tags are used.

From the foregoing description it is seen that the behavior of a switch or other equipment may be conceptually guided by a set of simple rules. While the particular switch architecture should be taken into account, implementing definitions can be accomplished independently of specific server load balancing behavior.

Consider now implementation of the present invention, within the layer two level on the server-side of an Ethernet-compatible network. In the following description, "hme" nomenclature shall refer to device drivers such as are included in the trunking pseudo-driver layer 150, indicated in FIG. 3 and in FIG. 4A. In the preferred embodiment, an hme device provides 10/100 Mbps Ethernet-compatible interface on several hardware platforms, including many systems under development by Sun Microsystems, Inc. The hme device on these various platforms is preferably controlled by the same hme device driver binary. A description of an hme device driver and trunking will now be given, as well as a description of such architectural and hme driver software changes as are needed to trunk together multiple hme devices.

By way of overview, the hme device driver is preferably a 2.x Solaris STREAMS-based driver that provides a Data Link Provider Interface ("DLPI") interface. In the preferred embodiment, this driver controls the network interface based on the Fast Ethernet Parallel Port SCSI ("FEPS") ASIC for Sun Microsystems Sbus type platforms, and based upon the Sun Microsystems Cheerio class ASIC for PCI platforms to ensure MAC functionality and Media Independent Interface ("MII") transceivers. The driver also provides ioctl function to set/get driver configuration parameters using the ndd command. The driver source code consists of the following files:

usr/src/uts/sun/io/hme.c—contains all the C functions;
usr/srclutslsunlsys/hme.h—contains the data structured definitions for the driver;
usr/src/uts/sun/sys/hme_mac.h—contains the definitions of the MAC (FEPS or Cheerio) ASIC
usr/src/uts/sun/sys/hme_phy.h—contains the definitions for the MII transceiver.

Those skilled in the art will appreciate that data structures and functions in the hme driver may be implemented in many ways. What follows is a description of a preferred implementation for some of these structures and functions.

Linked list of STREAMS structures

* Per—Stream instance state information.
*
* Each instance is dynamicallyallocatedat open () and
*free'd at close ( ). Each per—Stream instance points
*to at most one per-device structure using the sb_hmep
*field. All instances are threaded together into one list
*of active instances ordered on minor device number.
*/

```
struct hmestr {
    struct hmestr *sb_nextp; /* next in list */
    queue_t *sb_rq;
    struct hme *sb_hmep;   /* attacheddevice */
    u_long sb_state;       /*currentDLstate*/
    u_long sb_sap;         /*boundsap*/
    u_long sb_flags;       /*misc.flags*/
    u_int sb_mccount;      /*#enabledmulticastaddrs*/
    struct ether_addr*sb_mctab; /*tableofmulticastaddrs*/
    u_long sb minor;       /*minordevicenumber*/
    kmutex t sb_lock;      /*protecU this structure*/
};
/*
*Linkedlistofactive(inuse)driverStreams.
*/
static struct hmestr *hmestrup=NULL;
```

Linked list of hme structures:
/*
*HMEDeviceChannelinstancestateinformation.

*Each instance is dynamically allocated on first attach.

```
*/
struct fume{
    struct hme *fume nextp; /*nextinalinkedlist*/
    dev_info_t *fume dip; /*associateddev_info*/
/*datastructurestocontrolthetransceiver,MACandtostorestats*/
    ----
    ----
    ----
};
```

All hme instance data structures are linked together using the hme nextp field. The pointer to the head of this list is:

staticstructhme*hmeup=NULL;

Driver Functions: The driver functions and configurations will now be given.

Configuration: The functions to configure the driver in the Solaris 2.x kernel are preferably:

hmeinfo
  returns info about the device;

hmeidentify
  identifies the name of the device as "hme" or "SUNW,hme";

hmeattach
  allocates the hme structure for the device instance and initializes with the configuration parameters; also registers the hme interrupt handler function for the device. hmedetach
  de-allocates the hme structure and other memory allocated to the device instance; also unregisters the interrupt handler for the device.

STREAMS Operations:

The functions to implement the STREAMS interface operations are preferably as follows: Interface:

hmeopen
  opens a STREAM by allocating a hmestr structure; puts the STREAM in DL_UNATTACHED state;

hmeclose
  closes a STREAM by de-allocating the hmestr structure and all other memory for that STREAM;

hmewput
  called by the upper-level module to pass a STREAMS message that may be a DLPI primitive or M_DATA message for fast-path operation or a special STREAMS message; M DATA messages are immediately transmitted by calling the hmestart() function; DLPI primitives are enqueued in the hme write queue to be processed by the service function hmewsrv() when the write queue is enabled for servicing;

hmewsrv
  called by the STREAMS scheduler to process the messages enqueued in the hme write queue; this queue contains M_PROTO type messages and transmit messages waiting for free entries in the transmit descriptor ring; it calls hmestart() to transmit packets, and hmeproto() to process the M_PROTO type messages;

hmeioctl
  called by the upper-level modules to process the raw-mode, fast-path, and ndd set and get ioctls.

DLPI Operations:

The following functions are used to handle DLPI primitives:

hmeproto
  calls the proper routines to process the DLPI primitive message; calls the hmeudreq() function to process DL_UNITDATA_REQ type messages that contain data to be transmitted;

hmeareq
  processes the DL_ATTACH_REQ primitive, which initializes the sb_hmep field of the hmestr structure for the STREAM to point to the hme structure of the specified hme device instance; also puts the STREAM in DL_ATTACHED state;

hmedreq
  processes the DL_DETACH_REQ primitive; detaches the STREAM from the associated hme device and puts the STREAM in DL_UNATTACHED state;.

hmebreq
  processes the DL_BIND_REQ primitive; associates the STREAM with the specified DLSAP (Data Link Service Access Point) value, which is the type field in the Ethernet header; also puts the STREAM in DL_IDLE state and enables packet transmission and reception;

hmeubreq
  processes the DL_UNBIND_REQ primitive; removes the DLSAP associated with the STREAM and sets the STREAM state to DL_UNBIND_REQ;
hmeireq
  processes the DL_INFO REQ primitive; returns device information such as device type, ethernet address, broadcast address, etc.;

hmeponreq
  processes the DL_PROMISCON_REQ primitive to enable the STREAM to receive either all packets (DL_PROMISC_PHYS mode) or all multicast packets (DL_PROMISC_MULTI mode) or all SAP values (DL_PROMISC_MULTI mode);

hmepoffreq
  processes the DL_PROMISCOFF_REQ primitive to turn-off the specifies promiscuous modes;

hmeemreq
  processes the DL_ENABMULTI_REQ primitive to enable the reception of the specified multicast address;

hmedmreq
  processes the DL_DISABMULTI_REQ primitive to disable reception of the specified multicast address;

hmepareq
  processes the DL_PHYS_ADDR_REQ primitive to return either the factory address (DL_FACT_PHYS_ADDR requested) or the current address (DL_CURR_PHYS ADDR requested);

hmespareq
  processes the DL_SET_PHYS_ADDR_REQ primitive to set the specified ethernet address;

hmeudreq
  processes the DL_UNITDATA_REQ primitive to package data in the message into an Ethernet packet and calls the hmestart() function to transmit the packet.

Hardware Initialization:

hmeinit
  initializes the hardware (MAC and the transceiver) and initializes software resources for transmitting and receive packets; is called first time when the device is attached to a STREAM, and is also called when any hardware reprogramming is required, for example, to enable/disable promiscuous mode, to enable/disable multicast reception, to change link speed and mode etc.; also called from the interrupt handler to recover from fatal errors;

hmouninit
 called to disable the hardware from receiving and transmitting packets, and to disable interrupts;

hme_reset_transceiver
 called from the hmeinit() function to reset the transceiver;

hme_try_speed
 called from the hmeinit() function to bring up the link using auto-negotiation;

hme_force_speed
 called from the hmeinit() function to bring up the link in the specified speed and mode (forced speed and mode);

hme_check_link
 called using the timeout() interface every 30 seconds to check the transceiver; the hme device driver supports products that use an onboard transceiver connected to a RJ45 connector or an external transceiver connected to an MII (Media Independent Interface) connector; this function polls for change of transceiver and if transceiver has changed, it calls the hmeinit() function to re-initialize the MAC and the transceiver;

Packet Transmission and Packet Reception:

hmestart
 called by the hmewput() for M_DATA type messages (fast-path) and hmeudreq() for M_PROTO messages with DL_UNITDATA primitive, to transmit an Ethernet packet; also calls the hmereclaim() function to release transmit resources if more than some number (e.g., >64) of descriptors have to be reclaimed; if there are no free transmit descriptors, the message is enqueued at the top of the STREAMS write queue and sets a flag for the queue to be enabled and scheduled for processing again when free transmit descriptors are available;

hmeintr
 this routine reads the FEPS/Cheerio status register and checks for events such as errors, packet reception and transmission; normally transmit interrupts are disabled; in case of fatal errors, hme_fatal_error() function is called to update status and to call hmeinit() function to re-initialize hardware and software data structures; in the case of non-fatal errors, it calls hme_non fatal_err()function;
 if packet transmission event is reported, it calls the hmereclaim() function to free the transmit descriptors and the transmit packet buffers;
 if packet reception event is reported, it calls the hmeread() function in a loop to process each received packet;

hmereclaim
 this function loops through the transmit descriptor ring from the last reclaimed descriptor until the last packet transmitted; for each transmitted descriptor, it frees the transmitted packet buffer and updates transmit packet count for each packet transmitted; if any packets in the write queue are waiting for free transmit descriptor entries, the write STREAMS queues are enabled for processing by the STREAMS scheduler;

hmeread
 a free STREAMS message buffer is allocated and posted to the hardware in the receive descriptor ring in place of the received packet; if there is no free buffer, the received data are discarded and the buffer is re-posted to the hardware in the receive descriptor ring;
 typically only one stream will be open from the IP layer with sb_sap field value set to ETHERTYPE_IP; the hme structure contains a field hme_ipq to point to the read queue of such a stream; if the type field of the received packet is ETHERTYPE_IP, then this packet is sent to that queue for IP processing; otherwise the received packet type field is compared with the sb_sap field of all the streams attached to the hme device and a copy of the packet is sent up all the streams that are eligible to receive the packet.

As noted, implementation of the present invention in a trunked Ethernet protocol requires adherence to the nine enumerated rules enumerated earlier herein.

In one implementation of the present invention, trunking uses a STREAMS multiplexing pseudo-driver, e.g., software only, and plumbs hme devices that are members of the trunk below it. However, this approach requires some changes in the hme driver and entails the overhead of using a STREAMS putnext()function for communication between the pseudo-driver and the hme driver.

A more preferred embodiment modifies the hme driver itself to support trunk configuration using the ND SET and ND_GET ioctl interface and the ndd command. This embodiment is preferred as it eliminates much code duplication in the pseudo-driver and avoids the overhead of an additional STREAMS layer.

System booting over a trunk is not possible because the boot code in the fcode does not handle a trunk. The code may transmit boot requests over one of the links, but when the switch sends the responses over multiple links, it does not handle all those packets.

In configuring the trunk, one of the hme devices is identified as the trunk-head and others are identified as trunk-members. For example, consider four hme devices denoted hme 1, hme2, hme3, and hme4, which are to be configured as a trunk. Each of these devices may have different local MAC addresses but to be part of the same trunk all of these devices should be configured with the same MAC address. This is readily achieved by selecting one of the devices as the trunk-head and others as trunk-members. The MAC address of the trunk-head can be selected as the MAC address for all other trunk-members. Further, the instance number for the trunk-head will be used by the user programs and the higher-level protocol modules to access the trunk for data transfers, and other trunk-members will not be accessible for any DLPI protocol operations. For example, if hme 1 is selected as the trunk-head, then the user would create/etc/hostname.hme1file, so that hme 1 interface is plumbed for TCP/IP protocol access during system boot process.

When a system boots (either from the local disk or over the network using a non-trunked network interface), the kernel configures all network interfaces in the usual fashion as individual links, with local MAC addresses, if any. After kernel configuration is complete, the /sbin/init process executes the /sbin/rcS script, which executes the /etc/rcS.d/S30rootusr.sh script file for configuring network interfaces for which the /etc/hostname.xx files exist. By placing the ndd commands to configure the trunk in a shell script file in the /etc/rcS.d directory and naming the file, by way of example, S20trunk.sh, the innit process can be forced to configure the trunk before executing any network interface configuration commands.

Once a trunk is configured, configuration (trunk members or trunk-head) can be modified preferably only after modifying the /etc/rcS.d/S20trunk.sh file and rebooting the system. This restriction helps avoid possible confusion for applications that may maintain a history of network interfaces in the system. Most preferably, a link should be added to a trunk or removed from a trunk after a corresponding reconfiguration operation with the switch to which the trunk is connected.

Configuration Commands:

The hme driver preferably supports the following user-configurable ndd variables for each interface:

trunk-id—each trunk is identified with a number in the range 1–256; 0 value indicates that the interface does not belong to a trunk;

trunk-head—value of 1 indicates that the interface is the trunk-head; otherwise the value will is 0; this parameter valid only if trunk-id parameter is in the range 1–256.

The following sequence of commands in the /etc/rcS.d/S20trunk.sh file illustrate configuration of a trunk consisting of hme1, hme2, hme3, and hme4interfaces, with trunk-id as 10 and with hme2as the trunk-head:

ndd -set /dev/hme 1:trunk-id 10
ndd -set /dev/hme 2:trunk-id 10
ndd -set /dev/hme 3:trunk-id 10
ndd -set /dev hme 4:trunk-id 10
ndd -set /dev hme 2:trunk-head 1

First all trunk members should be identified with a trunk-id, and then the last command should identify the trunk-head. When the trunk-head is identified, the trunk configuration is completed by re-initializing all the trunk member interfaces using the MAC id of the trunk-head interface. After this step, only hme2(the trunk-head) will be accessible to the users directly, e.g., only hme2can be attached to any streams. The other trunk-member interfaces hme1, hme3and hme4cannot be accessed by the users, e.g., cannot be attached to any streams.

Once the trunk is configured, the trunk-head hme2interface is used just like any non-trunked network interface. For example, it can be referenced by the if config command to plumb the TCP/IP protocol stack. All packets sent to the hme2device by user programs or the IP layer will be sent over one of the links in the trunk such that the order of packets in a flow is maintained. All the packets received on any of the links in the trunk are sent up the streams attached to the hme2device.

Only the trunk-head device can be accessed by ndd to change link speed and mode. Even though it is possible to operate the trunk at 10/100 Mbps speeds and in half-duplex/full-duplex modes, it appears best to support only 100 Mbps speed and only full-duplex mode. Accordingly, in the preferred embodiment, any trunk-member operable only at 10 Mbps speed or in half-duplex mode is treated as if that link were down.

Transmission Load Balancing:

Messages sent down streams attached to the trunk-head device for transmission should be sent over one of the links in the trunk such that packet flow order in any flow is not broken. Preferably, no more than one-link bandwidth of data should be sent to any particular destination MAC address, unless that particular destination is also known to be trunked. Such will be the case, for example, when the trunk connects two servers directly. Thus, distribution of packets to links will be normally based on the destination MAC address in the Ethernet header.

The user can indicate when a trunk connects two servers directly by setting a configuration variable in the driver. In such case, packet distribution will be based on the TCP/UDP port number for TCP/UDP packets. Other IP or non-IP packets will be distributed based on the destination MAC address, which advantageously provides for the possibility of distributing different multi-cast streams to different links.

But as noted in rule number 4 earlier herein, it is important to preserve temporal ordering of packets. A preferred method to preserve temporal order when transmitting packets is to always use the same link, determined by hashing the flow-id (Destination MAC address or the TCP/UDP port number) to the link-id. Many hashing schemes may be used, the goal being to providing a randomizing function.

A linkmap table is used to map the flow-id to a particular link. The number of linkmap table entries will equal the number of trunk-members (including the link-head) if the number of trunk-members is a power of 2. If not a power of 2, the number of entries should be equal to the next higher power of 2. For example, if there are five trunk-members, there will be eight entries in the linkmap table. Each linkmap table entry contains a pointer to a trunk-member and contains some state information for using that trunk-member. If the size of the linkmap table is $2^n$, then the last n bits of the flow-id of a Tx packet may be used to index the linkmap table and to select a trunk-member for transmitting the packet.

At the time of trunk configuration (when the trunk-head is identified), the linkmap table is created and initialized with pointers to trunk-members, preferably in a round-robin fashion. If the trunk size is not a power of 2, some trunk-members are assigned to two entries.

When a trunk-member link goes down, the entries in the linkmap table that contained pointers to that trunk-member are changed to point to another active trunk-member. The state information for these entries is modified to wait for a timeout before using this new trunk-member for transmission of packets with flow-ids that map to these entries. Such packets are held back in the STREAMS queues until the timeout occurs. Using such timeout helps maintain the temporal order of packets sent out before the trunk-member failure. In contrast to prior art approaches wherein a failed link implies data loss, the present invention can maintain data flow, albeit via a different flow path.

Similarly, when a failed trunk-member link recovers, at least one entry in the linkmap table will be modified to point to this recovered trunk-member. The state for those entries is modified to wait for a timeout before using those entries for further transmissions.

Preferred Data Structures for Trunking:

The following user-configurable ndd variables preferably are added to the hme_param_array[] structure in the hme.h file:

trunk-id
trunk-head
flow-type
  this parameter indicates whether destination MAC address or TCP/UDP destination port-id should be used for flow identification: e.g., 0 denotes use destination MAC address and 1 denotes use TCP/UDP port id;

```
In the "hme" structure for each interface, add:
    unsigned int hme_trunkid;
    unsigned int hme_trunkhead_flag; /* indicates whether this
        device is the trunkhead */
    structhme_trunk*hme_trunkp; /* pointer to an array of
        hme_trunk structures for the trunk with trunkhead as the
        first entry */
    unsignedinthme_linkmap_refcnt; /* no. of entries in the
        linkmap table pointing to this trunk-member */
    /*New structure definitions */
    /*trunk related information which is dynamically created
        when the trunkhead is identified */
    structhme_trunk {
        kmutex_t    tr_lock; /* lock to protect this structure */
        unsignedinttr_flowid_type; /*whether dst mac id or tcp/
            udpport id*/
        structhme_flowidtr_last_flowid; /* flowid of the last
        packet */
        unsignedinttr_last_link_id; /*index of the link used for
        last packet */
        structhmep*tr_members; /*pointer to an array of trunk-
        members. first member is the trunkhead */
        unsignedinttr_trunksize; /*no. of trunkmembers in the
        above array */
        structhme_linkmap *tr_linkmap; /* pointer to the linkmap
        table */
        unsigned inttr_linkmap_size; /* no. of entries in the
        linkmap table */
    };
```

Functions for Trunking:
  hmeioctl
    adds code to handle the new ndd variables trunk-id,
      trunk-head and flow-id;
    when a new trunk-head is specified, allocates a structure for the trunk and initializes the trunk-member structures and initialize trunk-member hardware devices by calling hmeinit();
    adds code support ndd variables that contain the instance number, i.e. variables of the form <nn>:<name> where nn is the instance number and name refers to the parameter.
  hmedetach
    if trunked, deallocates all dynamic data structures allocated for trunk support;
  hmeareq
    adds code to return error if the device is configured as a non-trunk-head trunk-member;
  hme_trunk_init
    new function: wherever hmeinit()is called to change MAC parameters/mode, calls hme_trunk_init()so that the MAC address, multicast addresses, promiscuous-mode etc. are set for all trunk-members;
  hme_trunk_start
    new function: wherever hmestarto is currently called to transmit a packet, calls hme_trunk_starto to handle packet transmission for a trunk;
    this function will use flow-id for the packet to determine the link to be used; if the packet can be posted to a link, it will call hmestart() to transmit the packet on that link; if the packet cannot be posted on any link, it will be put back in its STREAMS queue and the tr_txall_wait flag is set;
  hmeintr
    if link status indicates link-down condition for a trunk-member, assigns an alternate trunk-member, and starts a time-out before using the new-trunk member;
  hmeread
    after getting the received packet in an mblk, use the "hmep" pointer for the trunk-head to send up the mblk;

Modifications and variations may be made to the disclosed embodiments without departing from the subject and spirit of the invention as defined by the following claims.

What is claimed is:

1. A method of dynamically controlling data flow between physical links of a network system, the method comprising the step of:
  logically combining multiple said physical links into a single logical channel referred to as a trunk; and
  a server in said system assigning a single media access control (MAC) layer address to said trunk.

2. The method of claim 1, wherein:
  each of said physical links comprising said trunk is representable by identical physical layer and identical MAC layer characteristics.

3. The method of claim 1, further comprising:
  dynamically controlling said data flow to substantially balance data flow carried by each of said physical links comprising said trunk.

4. The method of claim 1, further comprising:
  constructing said single MAC layer address using map-table information available to said system.

5. The method of claim 1, further comprising:
  randomly selecting a destination address for one of said physical links.

6. The method of claim 5, wherein said randomly selecting includes hashing destination MAC layer addresses for said physical links.

7. The method of claim 1, further comprising:
  distributing data packets from a server in said system to chosen ones of said physical links such that temporal order of data flow is preserved.

8. The method of claim 7, further comprising:
  said server distributing said data packets over a common segment of said trunk.

9. The method of claim 1, further comprising:
  defining, for a server in said system representable by a multi-layer model including at least a physical layer and a network layer, a pseudo-driver software layer disposed intermediate said physical layer and said network layer.

10. The method of claim 9, wherein:
  said pseudo-driver software layer functions as a multiplexer in a receive path and functions as a de-multiplexer in a transmit path.

11. The method of claim 1, wherein said network is Ethernet-compatible.

12. The method of claim 1, wherein said network functions in full-duplex mode.

13. A network system, comprising:
  a first physical link, coupleable to said network system;
  a second physical link, coupleable to said network system;
  a server having a server interface that dynamically combines the first and second physical links into a single logical channel referred to as a trunk by assigning a single media access control (MAC) layer address to said trunk.

14. The network system of claim 13, wherein:
  each of said physical links comprising said trunk is representable by identical physical layer and identical MAC layer characteristics.

15. The network system of claim 13, wherein said MAC layer address is generated with an address generator selected from a group consisting of (i) a map-table, (ii) a random selector of destination media access control layer addresses for said physical links, and (iii) a hash unit that hashes destination medial access control layer addresses for said physical links.

16. The network system of claim 13, wherein said server interface dynamically balances data flow carried by each of said physical links comprising said trunk.

17. The network system of claim 13, wherein said server distributes data packets to chosen ones of said physical links such that temporal order of data flow is preserved.

18. The network system of claim 13, wherein:

said interface includes a pseudo-driver software layer disposed intermediate a physical layer and a network layer in said server;

said pseudo-driver software layer functioning as a multiplexer in a receive path and functioning as a de-multiplexer in a transmit path.

19. The network system of claim 13, wherein said network system has at least one characteristic selected from a group consisting of (i) said network functions in full-duplex mode, (ii) said network is an Ethernet network, and (iii) said network is Ethernet-compatible.

20. The method of claim 1, wherein said server assigns said MAC layer address by selecting one of the said multiple physical links as the trunk-head and using the MAC address of the trunk head as the MAC address of the trunk.

21. A server comprising:

a first physical port to provide a physical link to a network;

a second port to provide a second physical link to the network; and a server interface that dynamically combines the first port and the second port into a single logical channel referred to as a trunk by assigning a single media access control (MAC) layer address to said trunk.

22. The server of claim 21, wherein each of said physical links comprising said trunk is representable by identical physical layer and identical MAC layer characteristics.

23. The server of claim 21, wherein said server dynamically controls said data flow to substantially balance data flow carried by each of said physical links comprising said trunk.

24. The server of claim 21, wherein said server constructs said single MAC layer address using map-table information available to said system.

25. The server of claim 21, wherein said server randomly selects a destination address for one of said physical links.

26. The server of claim 25, wherein said randomly selection includes hashing destination MAC layer addresses for said physical links.

27. The server of claim 21, wherein said server distributes data packets over said physical links such that temporal order of data flow is preserved.

28. The server of claim 27, wherein said server distributes said data packets over a common segment of said trunk.

29. The server of claim 21, wherein said server defines a pseudo-driver software layer disposed intermediate the physical layer and the network layer.

30. The server of claim 29, wherein said pseudo-driver software layer functions as a multiplexer in a receive path and functions as a de-multiplexer in a transmit path.

* * * * *